United States Patent [19]
Solgaard et al.

[11] Patent Number: 6,097,859
[45] Date of Patent: Aug. 1, 2000

[54] MULTI-WAVELENGTH CROSS-CONNECT OPTICAL SWITCH

[75] Inventors: Olav Solgaard; Jonathan P. Heritage; Amal R. Bhattarai, all of Davis, Calif.

[73] Assignee: The Regents of the University of California, Oakland, Calif.

[21] Appl. No.: 09/022,591

[22] Filed: Feb. 12, 1998

Related U.S. Application Data

[60] Provisional application No. 60/038,172, Feb. 13, 1997.

[51] Int. Cl.$^7$ ........................................................ G02B 6/35
[52] U.S. Cl. ................................................ 385/17; 385/18
[58] Field of Search .......................................... 385/16–24

[56] References Cited

U.S. PATENT DOCUMENTS

| | | | |
|---|---|---|---|
| 4,655,547 | 4/1987 | Heritage et al. | 359/563 |
| 4,866,699 | 9/1989 | Brackett et al. | 359/115 |
| 5,166,818 | 11/1992 | Chase et al. | 359/170 |
| 5,255,332 | 10/1993 | Welch et al. | 385/17 |
| 5,305,402 | 4/1994 | Hill et al. | 385/18 X |
| 5,581,643 | 12/1996 | Wu | 385/17 |
| 5,671,304 | 9/1997 | Duguay | 385/17 |
| 5,841,917 | 11/1998 | Jungerman et al. | 385/17 |
| 5,878,177 | 3/1999 | Karasan et al. | 385/17 |
| 5,960,132 | 9/1999 | Lin | 385/18 |
| 5,960,133 | 9/1999 | Tomlinson | 385/18 |

OTHER PUBLICATIONS

Jeong et al, "Comparison of Wavelength–Interchanging and Wavelength–Selective Cross–Connects in Multiwavelength All–Optical Networks", PROC. of 1996 15th Annual Joint Conf. of IEEE Computer & Communications Societies, INFOCOM '96, Part 1 (of 3), 1996, pp. 156–163.

Patel, J.S. et al., "Liquid Crystal and Grating–Based Multiple–Wavelength Cross–Connect Switch", IEEE Photonics Technology Letters, vol. 7, No. 5, May 1995, pp. 514–516.

*Primary Examiner*—John D. Lee
*Attorney, Agent, or Firm*—John P. O'Banion

[57] ABSTRACT

A cross-connect switch for fiber-optic communication networks employing a wavelength dispersive element, such as a grating, and a stack of regular (non-wavelength selective) cross bar switches using two-dimensional arrays of micromachined, electrically actuated, individually-tiltable, controlled deflection micro-mirrors for providing multiport switching capability for a plurality of wavelengths. Using a one-dimensional micromirror array, a fiber-optic based MEMS switched spectrometer that does not require mechanical motion of bulk components or large diode arrays can be constructed with readout capability for WDM network diagnosis or for general purpose spectroscopic applications.

20 Claims, 8 Drawing Sheets

MULTI-WAVELENGTH CROSS-CONNECT OPTICAL SWITCH

CROSS-REFERENCE TO RELATED APPLICATIONS

This application claims priority from U.S. provisional application Ser. No. 60/038,172 filed on Feb. 13, 1997.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to a cross-connect switch for fiber-optic communication networks including wavelength division multiplexed (WDM) networks, and more particularly to such an optical switch using a matrix of individually tiltable micro-mirrors.

2. Description of the Background Art

Multi-port, multi-wavelength cross-connect optical switches with characteristics of large cross-talk rejection and flat passband response have been desired for use in wavelength-division multiplexed (WDM) networks. Four-port multi-wavelength cross-bar switches based on the acousto-optic tunable filter have been described ("Integrated Acoustically-tuned Optical Filters for Filtering and Switching Applications," D. A. Smith, et al., IEEE Ultrasonics Symposium Proceedings, IEEE, New York, 1991, pp. 547–558), but they presently suffer from certain fundamental limitations including poor cross-talk rejection and an inability to be easily scaled to a larger number of ports. Attempts are being made to address to this problem by dilating the switch fabric, both in wavelength and in switch number, to provide improved cross-talk rejection and to expand the number of switched ports so as to provide an add-drop capability to the 2×2 switch fabric. This strategy, however, adds to switch complexity and cost. Recently, Patel and Silberberg disclosed a device employing compactly packaged, free-space optical paths that admit multiple WDM channels spatially differentiated by gratings and lenses ("Liquid Crystal and Grating-Based Multiple-Wavelength Cross-Connect Switch," IEEE Photonics Technology Letters, Vol. 7, pp. 514–516, 1995). This device, however, is limited to four (2×2) ports since it relies on the two-state nature of polarized light.

BRIEF SUMMARY OF THE INVENTION

It is therefore an object of this invention to provide an improved multi-wavelength cross-connect optical switch which is scalable in port number beyond 2×2.

Another object of the invention to provide such an optical switch which can be produced by known technology.

Another object of this invention to provide such an optical switch with high performance characteristics such as basic low loss, high cross-talk rejection and flat passband characteristics.

Another object of the invention is to provide a fiber-optic switch using two arrays of actuated mirrors to switch or rearrange signals from N input fibers onto N output fibers, where the number of fibers, N, can be two, or substantially larger than 2.

Another object of the invention is to provide a fiber-optic switch using 1-D arrays of actuated mirrors.

Another object of the invention is to provide a fiber-optic switch using 2-D arrays of actuated mirrors.

Another object of the invention is to provide a fiber-optic switch using mirror arrays (1-D or 2-D) fabricated using micromachining technology.

Another object of the invention is to provide a fiber-optic switch using mirror arrays (1-D or 2-D) fabricated using polysilicon surface micromachining technology.

Another object of the invention is to provide a fiber-optic switch using arrays (1-D or 2-D) of micromirrors suspended by torsion bars and fabricated using polysilicon surface micromachining technology.

Another object of the invention is to provide a fiber-optic switch with no lens or other beam forming or imaging optical device or system between the mirror arrays.

Another object of the invention is to provide a fiber-optic switch using macroscopic optical elements to image or position the optical beams from the input fibers onto the mirror arrays, and likewise using macroscopic optical elements to image or position the optical beams from the mirror arrays onto the output fibers.

Another object of the invention is to provide a fiber-optic switch using microoptics to image or position the optical beams from the input fibers onto the mirror arrays, and likewise sing microoptics to image or position the optical beams from the mirror arrays onto the output fibers.

Another object of the invention is to provide a fiber-optic switch using a combination of macrooptics and microoptics to image or position the optical beams from the input fibers onto the mirror arrays, and likewise using combination of macrooptics and microoptics to image or position the optical beams from the mirror arrays onto the output fibers.

Another object of invention is to provide a fiber-optic switch in which the components (fibers, gratings, lenses and mirror arrays) are combined or integrated to a working switch using Silicon-Optical-Bench technology.

Another object of the invention is to provide a fiber-optic switch using 2-D arrays of actuated mirrors and dispersive elements to switch or rearrange signals from N input fibers onto N output fibers in such a fashion that the separate wavelength channels on each input fiber are switched independently.

Another object of the invention is to provide a fiber-optic switch as described above, using diffraction gratings as wavelength dispersive elements.

Another object of the invention is to provide a fiber-optic switch as described above, using micromachined diffraction gratings as wavelength dispersive elements.

Another object of the invention is to provide a fiber-optic switch using fiber Bragg gratings as wavelength dispersive elements.

Another object of the invention is to provide a fiber-optic switch using prisms as wavelength dispersive elements.

Another object of the invention is to provide a fiber-optic based MEMS switched spectrometer that does not require mechanical motion of bulk components nor large diode arrays, with readout capability for WDM network diagnosis.

Another object of the invention is to provide a fiber-optic based MEMS switched spectrometer that does not require mechanical motion of bulk components nor large diode arrays, with readout capability for general purpose spectroscopic applications.

Further objects and advantages of the invention will be brought out in the following portions of the specification, wherein the detailed description is for the purpose of fully disclosing preferred embodiments of the invention without placing limitations thereon.

An optical switch embodying this invention, with which the above and other objects can be accomplished, may be characterized as comprising a wavelength dispersive element, such as a grating, and a stack of regular (non-wavelength selective) cross bar switches using a pair of two-dimensional arrays of micromachined, electrically actuated, controlled deflection micro-mirrors for providing multiport switching capability for a plurality of wavelengths.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 8, where like reference numerals denote like parts. It will be appreciated that the apparatus may vary as to configuration and as to details of the parts without departing from the basic concepts as disclosed herein.

Figure 1:
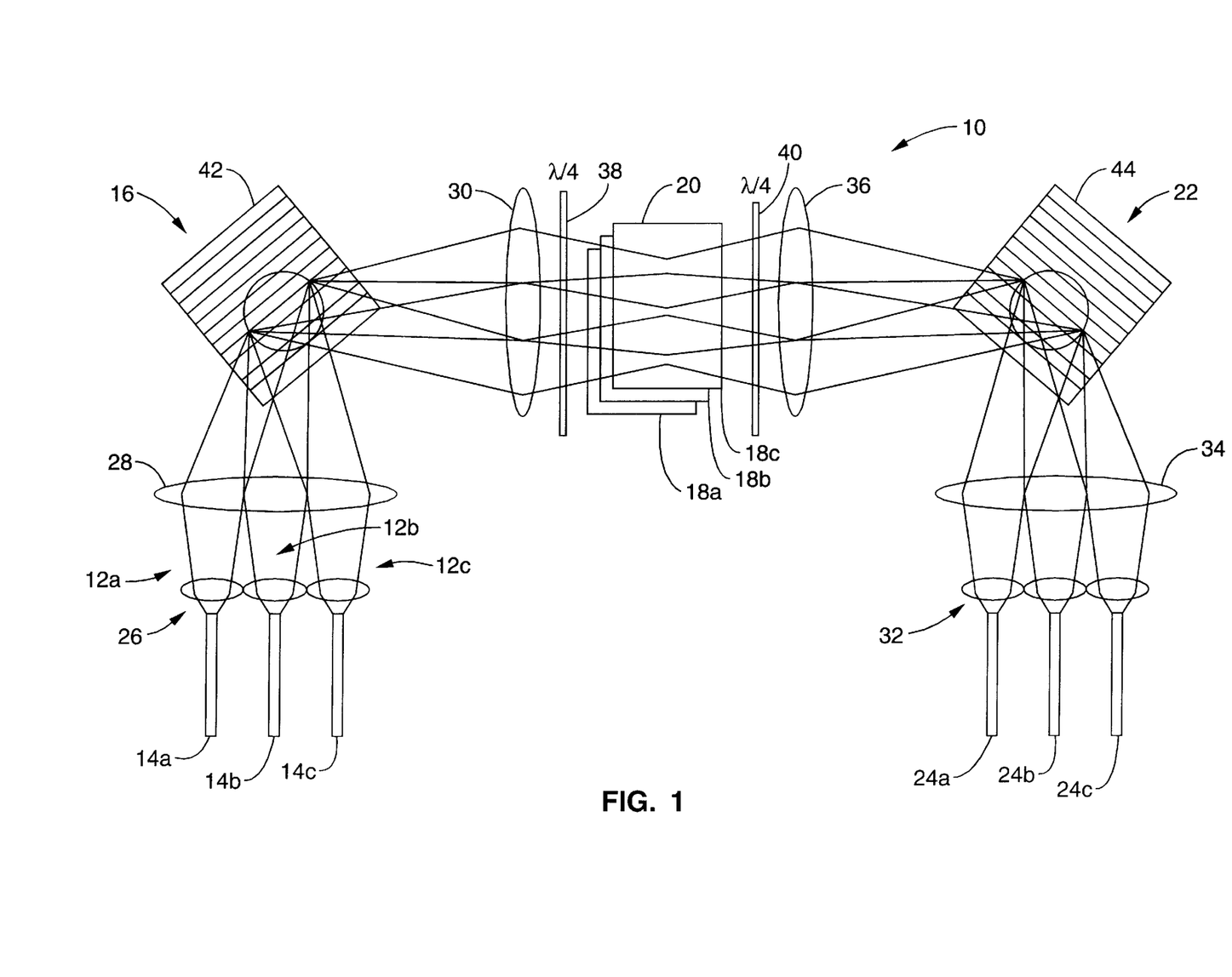
FIG. 1 is a schematic diagram of an optical switch in accordance with the present invention.

Referring first to FIG. 1, a multi-port (N×N ports), multi-wavelength (M wavelength) WDM cross-connect switch 10 embodying this invention is schematically shown where, in the example shown, N=3. In this switch 10, the wavelength channels 12a, 12b, 12c of three input fibers 14a, 14b, 14c are collimated and spatially dispersed by a first (or input) diffraction grating-lens system 16. The grating-lens system 16 separates the wavelength channels in a direction perpendicular to the plane of the paper, and the dispersed wavelength channels are then focused onto a corresponding layer 18a, 18b, 18c of a spatial micromechanical switching matrix 20. The spatially reorganized wavelength channels are finally collimated and recombined by a second (or output) diffraction grating-lens system 22 onto three output fibers 24a, 24b, 24c. The input and output lens systems are each composed of a lenslet array 26 (32) and a pair of bulk lenses 28, 30 (34, 36) such that the spot size and the spot separation on the switching matrix 20 can be individually controlled. Two quarter-wave plates 38, 40 are inserted symmetrically around the micromechanical switching matrix 20 to compensate for the polarization sensitivity of the gratings 42, 44, respectively.

Figure 2:
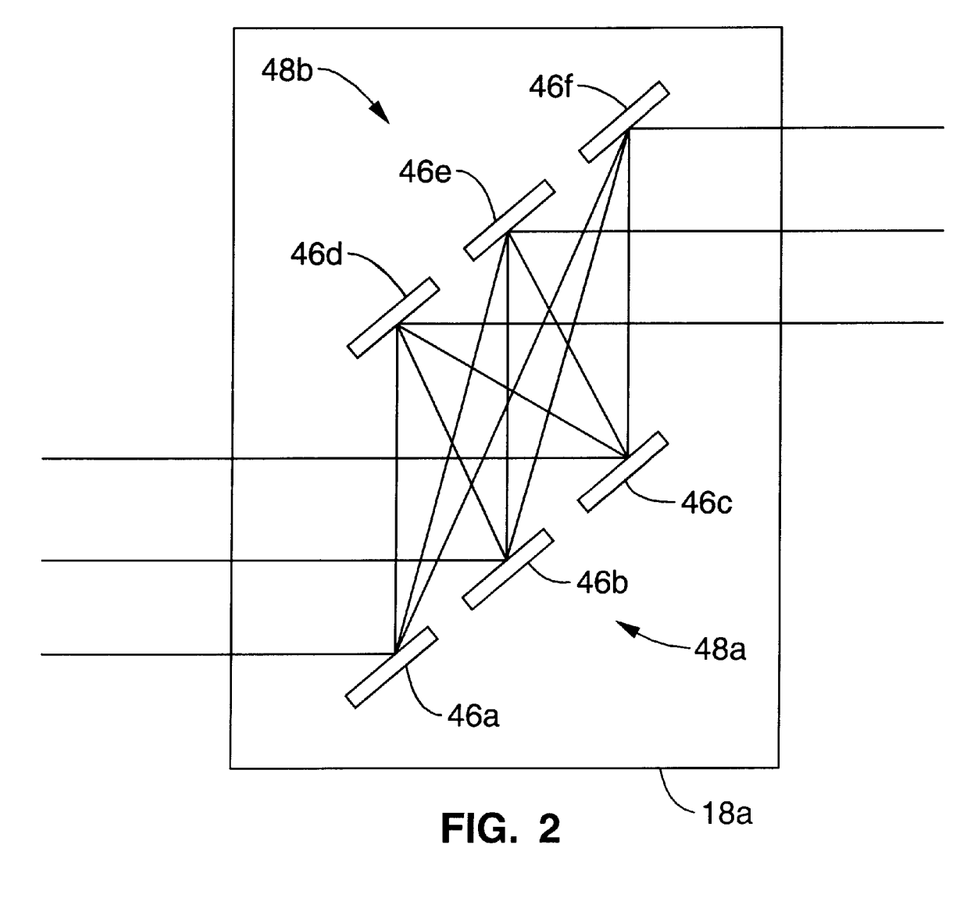
FIG. 2 is a schematic plan view of a single layer of the switching matrix portion of the optical switch shown in FIG. 1.
Figure 3:
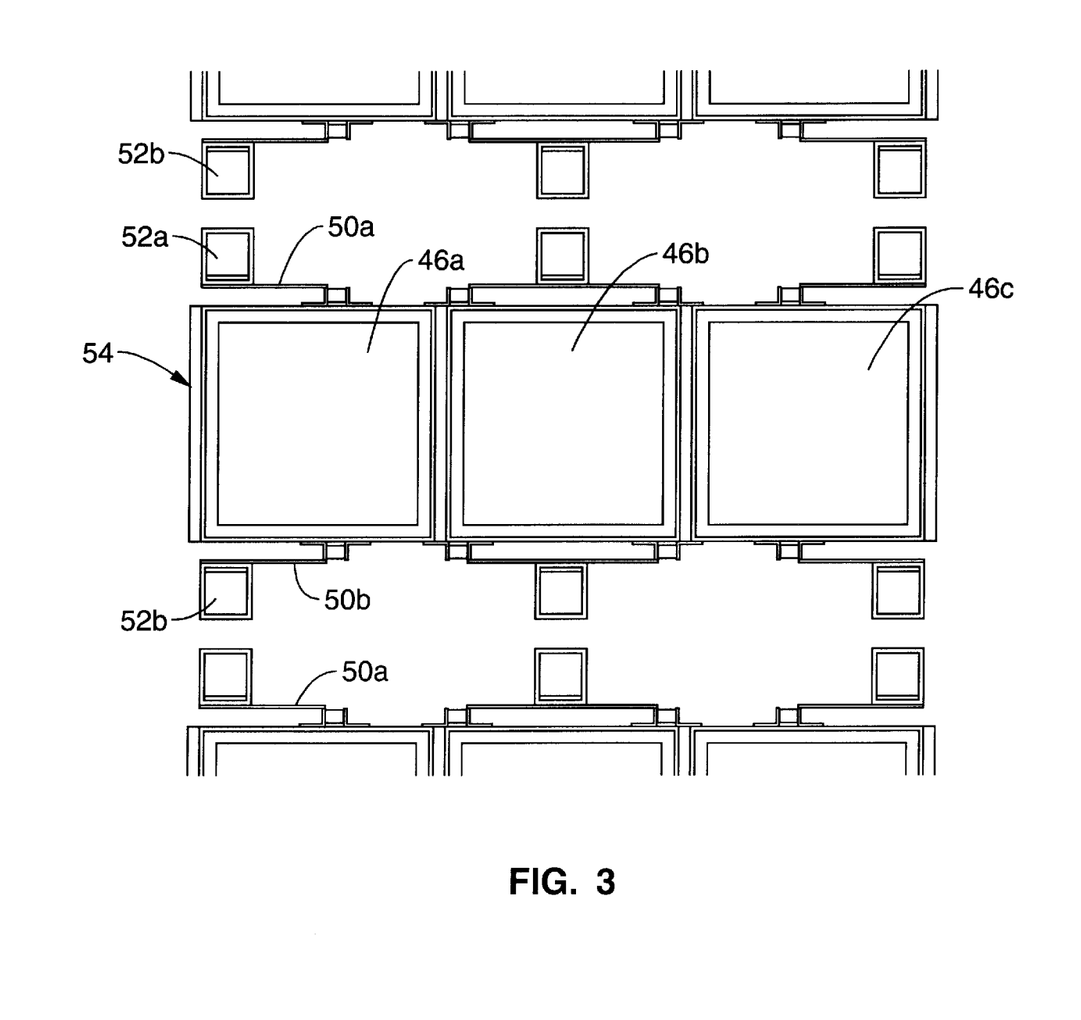
FIG. 3 is a diagrammatic plan view of a row of individually tiltable micro-mirrors employed in the switch array portion of the optical switch shown in FIG. 1.

Referring now to FIG. 2, a schematic plan view of a single layer 18a of the switching matrix 20 of FIG. 1 is shown. As can be seen in FIG. 2, six micromirrors 46a through 46f are arranged in two arrays 48a, 48b that can be individually controlled so as to optically "couple" any of the three input fibers 14a, 14b, 14c to any of the three output fibers 24a, 24b, 24c. Referring also to FIG. 3, an example of the structural configuration of a row of individually tiltable micromirrors on the switch array can be seen. As shown in FIG. 3, each mirror 46a, 46b, 46c is suspended by a pair of torsion bars or flexing beams 50a, 50b attached to posts 52a, 52b, respectively. Note that each mirror also includes a landing electrode 54 on which the mirrors land when they are deflected all the way down to the substrate.

The advantages of this switching matrix arrangement include low cross talk because cross coupling between channels must go through two mirrors, both of which are set up to reject cross talk, low polarization sensitivity, and scalability to larger numbers of input fibers than two (which is the limit for polarization-based switches). The preferred fabrication technology for the micromirror arrays is surface micromachining as disclosed, for example, in Journal of Vacuum Science and Technology B, Vol. 6, pp. 1809–1813, 1988 because they can be made by this method as small as the optical design will allow, they can be batch-fabricated inexpensively, they can be integrated with on-chip micromachinery from materials such as polysilicon and they can be miniaturized so as to reduce the cost of packaging.

Figure 4:
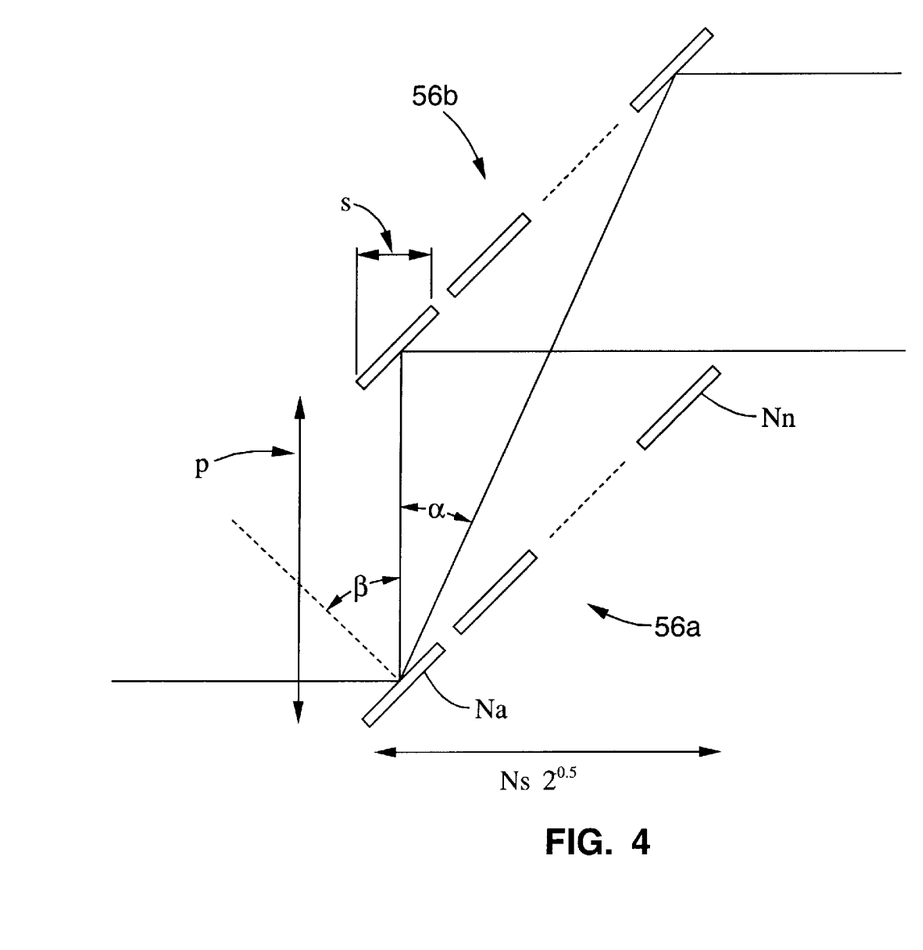
FIG. 4 is a schematic diagram showing switching matrix geometry in accordance with the present invention.

Referring now to FIG. 4, there are several factors to consider for designing the switching matrix 20. FIG. 4 shows an example of two mirror arrays 56a, 56b where each array comprises a plurality of mirrors, Na through Nn. The basic parameters are the Gaussian beam radium ($\omega_0$) at the center of the switch, the mirror size in the horizontal direction (s), the distance between the mirror arrays (p), the incident angle on the mirror arrays (β), and the maximum deflection of the micromirrors (t). The maximum angular deflection (α) of the optical beams is dependent on the maximum deflection and the mirror size (in the horizontal direction), or tan α=4t/s (the optical deflection being twice that of the mechanical deflection and the mirrors being tethered at their center points). Conditions that must be satisfied include: (i) the optical beams must be sufficiently separated on the mirrors to keep cross-talk at reasonable levels; (ii) the sizes of the arrays must be small enough such that no shadowing occurs; and (iii) the path length differences through the switch must not introduce significant variations in insertion loss.

If a Gaussian-beam formalism is used, the cross coupling of two parallel beams of radius $\omega_0$ offset by d is given as $\exp\{-(d/\omega_0)2\}$. If this should be less than 40 dB, for example, the ratio $C=d/\omega_0$ must be larger than 3. This minimum ratio applies to both fiber-channel (horizontal) separation and wavelength channel (vertical) separation. Since the beam radii are larger at the mirrors due to diffraction than at the focus, the above conclusion does not strictly apply, but it may be required that the spacing of the beams must be at least three times larger than the optical beam radius also at the mirrors. This requirement also reduces the losses due to aperture effects to insignificant levels. The minimum mirror spacing (which is larger or equal to the mirror size) is then expressed as:

$$s = C\omega/\cos\beta = C(\omega_0/\cos\beta)\{1+(\lambda p/2\pi\omega_0^2)^2\}^{1/2}$$

where C is a factor greater than 3, $\omega$ is the beam size at the mirrors, and $\lambda$ is the wavelength of the light. This requirement, together with the restrictions on angular deflection, puts an upper limit on the number of fiber channels (=N) in the switch. If the maximum deflection angle is assumed small, the maximum number of channels is:

$$N = 1 + \{4\pi\cos\beta/C^2\lambda\}t$$

The corresponding array separation and mirror spacing are:

$$p = 2\pi\omega_0^2/\lambda$$

and $$s = 2^{1/2}C\omega_0/\cos\beta$$

If C=3, $\beta$=0.3 radian and $\lambda$=1.55 micron, N is given by N=1+0.86 t where t is in micron. The conclusion is that the simple geometry of FIG. 4 can be used to design relatively large switches. Using known surface micromachining techniques, switches with three fiber channels can be fabricated with a total sacrificial layer thickness of 2.75 micron. Larger switching matrices will require thicker sacrificial layers, such as 8.1 micron for N=8 and 17.4 micron for N=16. These thicknesses can be obtained by simply using thicker sacrificial layers or by using out-of-plane structures, or through a combination of these.

The minimum beam radium $\omega_0$ is determined from the requirement that the first mirror array should not obstruct the beams after they are reflected from the second mirror, and that the second mirror array should not obstruct the beams before they reach the second mirror. If N is maximized, C=3, $\beta$=0.3 radian and $\lambda$=1.55 micron, the beam radium in micron must be larger than the number of fiber channels, or $\omega_0$>N micron. The requirement of maximum path length difference is less restrictive ($\omega_0$>0.8(N-1) micron). In general, the mirrors should be made as small as possible because miniaturization of the mirrors leads to increased resonance frequencies, lower voltage requirements and better stability. For N=3, $\omega_0$ should preferably be on the order of 3 micron, leading to a mirror spacing of s=13.3 micron. Mirrors of this size, as well as mirrors suitable for larger matrices are easily fabricated by a standard surface micromachining process. This implies that micromachined switching matrices can be scaled to large numbers of fiber channels (e.g., N=16).

The minimum mirror separation in the wavelength-channel dimension may be smaller than the mirror separation s given above by the factor of cos $\beta$ because the mirrors are not tilted in that direction. The spacing, however, may be larger because there is no switching in the wavelength direction and there is no maximum angle requirement. It may be preferred to add 20 to 30 micron of space between the mirrors for mirror posts (see FIG. 3) and addressing lines. For a switch with N=3 and s=110 micron, for example, a preferred separation in the wavelength dimension may be on the order of 130 micron. If the Littrow configuration is used, the required size of the Gaussian-beam radium on the grating is:

$$\omega_g = C_w\lambda^2/2\pi\Delta\lambda\tan\theta_c$$

where $C_w$ is the ratio of beam separation to beam radium in the wavelength dimension, $\Delta\lambda$ is the wavelength separation between channels and $\theta_c$ is the incident angle (which equals the diffraction angle in the Littrow configuration). With $C_w$=5.2 (25 micron beam radium and 130 micron wavelength-channel separation), $\lambda$=1.55 micron, $\Delta\lambda$=1.6 nm ("the MONET standard") and $\theta_c$=45 degrees, $\omega_g$ is 1.2 mm (the order of diffraction m being 1). This means that the long side of the grating perpendicular to the grooves must be on the order of 5.3 mm and the focal length $f_2$ of the second lens (the one between the grating and the microswitches) should be about 60.8 mm.

The rotation of the grating about an axis perpendicular to the optical axis and the grating grooves require a corresponding reduction of the grating period by $\Lambda = m\lambda\cos\phi/(2\sin\theta_c)$ where $\phi$ is the rotation angle of the grating. If m=1, $\lambda$=1.55 micron, $\theta_c$=45 degrees and $\phi$=30 degrees, the grating period is 0.95 micron.

In a simple system without the microlens arrays shown in FIG. 1, the magnification of the input plane onto the switching matrix is given by the ratio of the focal length $f_2$ of the second lens to the focal length $f_1$ of the first lens (e.g., lens 28 between the lenslets 26 and grating 42). The role of the lenslet is to allow a different magnification for the mode size and for the mode spacing. In the optimized geometry described above, the ratio of the mode separation to mode radius is $2^{1/2}$C=4.24. If the fibers are as close together as practically possible (e.g., 125 micron equal to the fiber diameter), the ratio on the input is 125/5=25. The mode radius therefore must be magnified 5.9 times more than the mode spacing. This can be accomplished in several ways.

According to one method, lenslets are used to magnify the fiber modes without changing the mode separation. The lenslets are placed less than one focal length in front of the fibers to form an imaginary magnified image of the fiber mode. Ideally, the lenslet diameters should be comparable to or smaller than the fiber diameter, allowing the minimum fiber separation and a short focal length of the first lens to be maintained.

According to another method, the fiber mode is expanded adiabatically over the last part of its length by a heat treatment so as to out-diffuse the core. Mode size increase on the order of 4 times can be accomplished.

According to still another method, the fibers are thinned down or microprisms are used to bring the modes closer together without changing the mode size.

The first two methods require the same magnification or reduction of the input field. The third method has the advantage that less reduction is needed, leading to smaller systems. If N=3, $\omega_0$=25 micron, s=110 micron and $f_2$=60.8 mm, the required magnification is 0.84. If lenslets of 125 micron diameter are used, the required focal length $f_1$ of the first lens is 72.4 mm. If lenslets of 200 micron diameter are used, the required magnification is 0.525 and the required focal length $f_1$ of the first lens is 115.8 mm.

Parameters of a switch according to one embodiment of this invention with three input channels and three output channels are summarized in Table 1.

Referring again to FIG. 3, the switching matrix design shown is compatible with the MUMP (the Multiuser Micro Electro-Mechanical System Process at the Microelectronics Center of North Carolina) and its design rules. The full switching matrix includes two arrays each with eight rows of the mirrors shown. The mirrors are actuated by an electrostatic field applied between the mirror and an electrode underneath (not shown). Each of the mirrors in the switching matrix has three states, but the mirrors in the three rows do not operate identically. The central mirror may send the beam to either side, while the outer mirrors only deflect to one side. According to one design, the two on the sides are mirror images of each other, the center mirror being either in the flat state (no voltage applied) or brought down to the point where it touches the substrate on either side. The electrode under the central mirror is split in two to allow it to tilt either way. The side mirrors also have a state that is half way between the flat state and the fully pulled-down state. This may be achieved by having continuous control over the mirror angles. Although this is complicated by the electromechanical instability of parallel plate capacitors because, as the voltage on the plates is increased, the capacitance goes up and this leads to a spontaneous pulling down of the mirror when the voltage is increased past a certain value, this effect can be avoided either by controlling the charge rather than the voltage on the capacitors, or by using an electrode geometry that pushes the instability point past the angle to be accessed. Charge control utilizes the full range of motion of the mirrors but complicates the driver circuitry for the switch. It may be preferable to use electrode geometry to achieve the required number of states.

When the MUMP process is used, the mirror size has a lower limit imposed by the minimum cross section that can be defined in this process. To achieve large tilt angles without too much deflection of the rotation axis of the mirror, the flexing beams must be kept short. The shorter the flexing beam, the larger the mirrors must be for the electrostatic force to be able to pull the mirrors down. Calculations show that the two side mirrors have the required angle when pulled down if use is made of beams that are 15 to 20 micron long, depending on the exact value of the material constants. For the voltage requirement to be acceptable, the mirror size must be on the order of 100×100 micron. The beams of the central mirror may be slightly longer, the maximum angle for the central mirror being half that of the side mirrors. The geometry as shown in FIG. 3 ensures that the side mirrors can be tilted to half their maximum angles before reaching the electrostatic instability. The corresponding resonance frequencies are on the order of 20 to 50 Khz. FIG. 3 shows one of 8 layers of micromirrors in the switching matrix described above; that is, the mirrors are separated by 110 micron in the horizontal (fiber-channel) direction and by 130 micron in the vertical (wavelength-channel) direction. Two such arrays make up a switching matrix as shown in FIG. 2. The mirrors are shown on landing electrodes, that are shorted to the mirrors, when deflected all the way down to the substrate. Addressing lines and shorts are not shown in FIG. 3.

Figure 5:
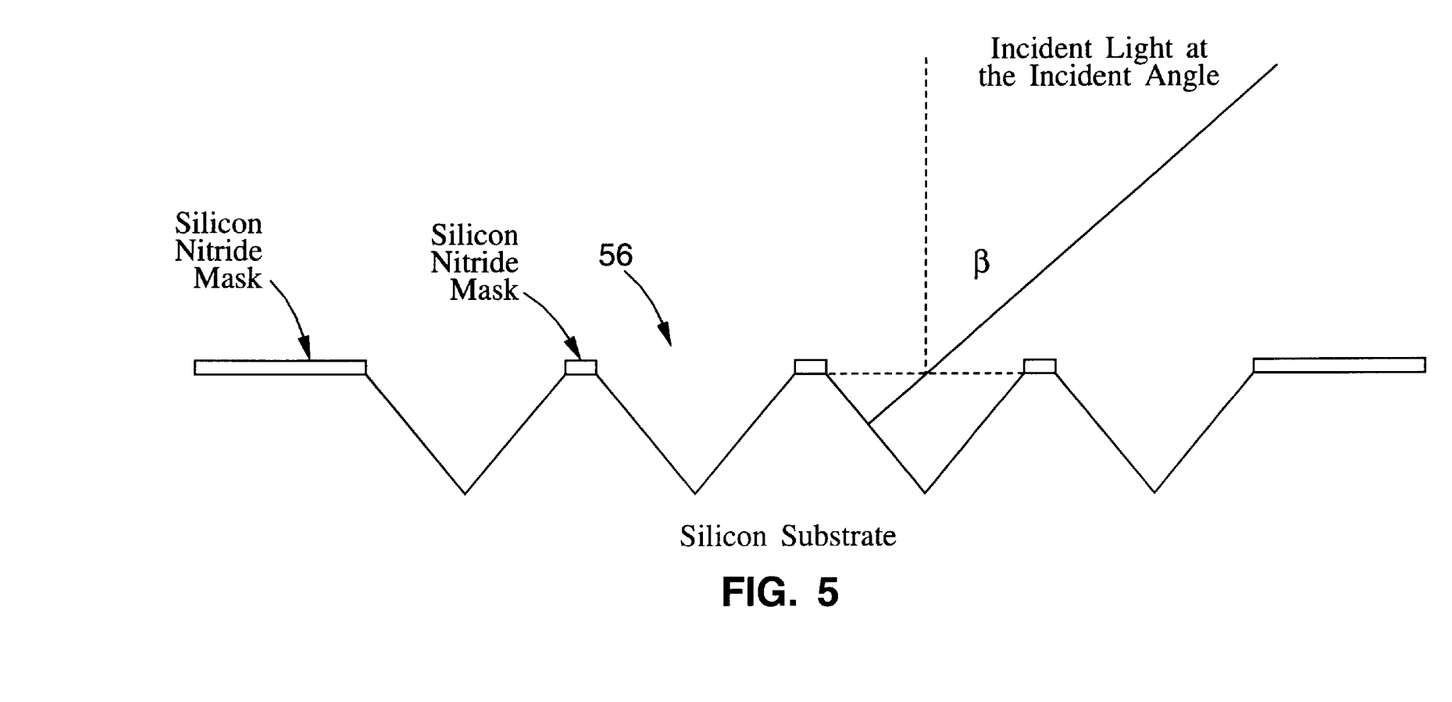
FIG. 5 is a schematic sectional view of a grating made in silicon by anisotropic etching.

The whole switch may be fabricated in so-called silicon-optical bench technology. The lenses, the switching arrays and the in/out modules may be integrated, but commercially available dielectric gratings are too bulky for this technology. Microgratings may be developed, based on anisotropic etching of silicon. Etching of the <100> surface of silicon through rectangular etch masks that are aligned with the [111] directions of the substrate, creates V-shaped grooves defined by the <111> crystallographic planes of silicon. An array of such V-grooves 56 constitutes a grating that can be used in the Littrow configuration as shown in FIG. 5. The spacing between grooves can be made arbitrarily small (e.g., 1 micron) by under-etching the mask and subsequently removing this layer. The Littrow angle, which is determined by the crystalline planes of silicon, is equal to 54.7 degrees. By taking advantage of the well-defined shape of a unit cell of the grating, it is possible to obtain high diffraction efficiency in higher order diffraction modes, the V-grooves constituting a blazed grating operated on higher orders. Higher-order operation means that the wavelength dependence of the diffraction efficiency increases. It can be shown that with 8 wavelengths separated by 1.6 nm centered at 1.55 micron and the grating geometry of FIG. 5, the diffraction order can be increased to m=15 with less than 1% variation in the diffraction efficiency between wavelength channels. With m =15, $\lambda$=1.55 micron, $\theta_c$=54.7 degrees and $\phi$=30 degrees, the grating period is calculated to be $\Lambda$=12.3 micron. V-grooves with this spacing can be easily patterned and etched by using standard micromachining technology. V-groove gratings fabricated in this way can be metallized and used as gratings directly, or be used as a mold for polysilicon microgratings that can be rotated out of the plane by using micro-hinges. A potentially very important additional advantage of higher-order gratings, as described here, is the reduced polarization sensitivity as compared to first-order gratings. Since the periodicity is much larger than the wavelength, the diffraction will be close to being independent of polarization. Still, two wave plates may be used to compensate for residual polarization sensitivity due to oblique angle reflections.

Figure 6:
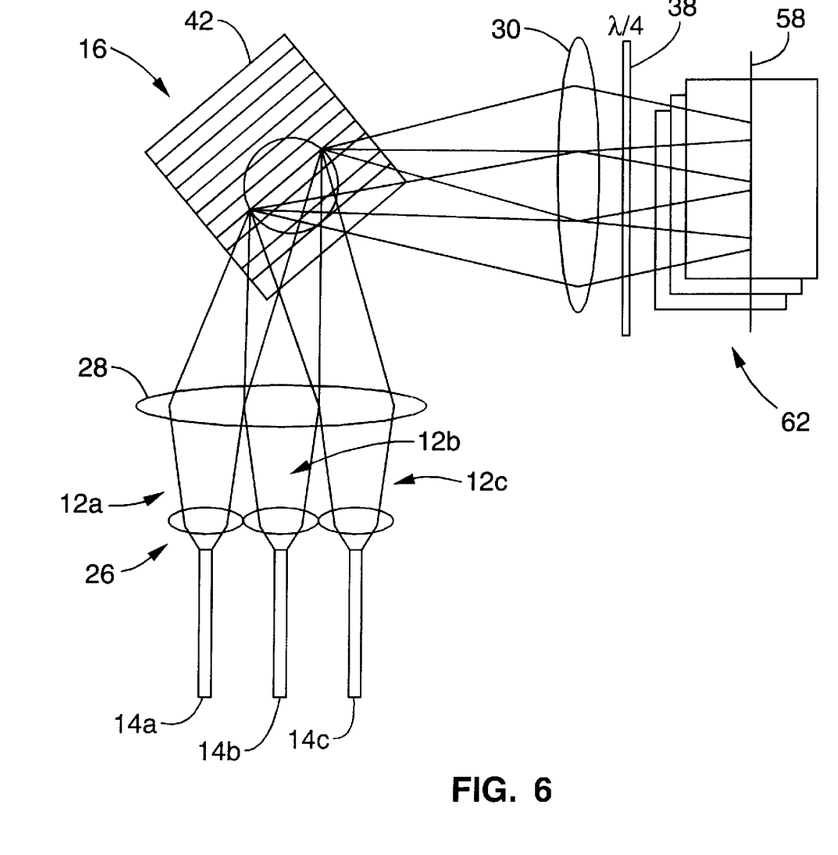
FIG. 6 is a schematic diagram of an alternative embodiment of the optical switch shown in FIG. 1 employing a mirror in the symmetry plane.
Figure 7:
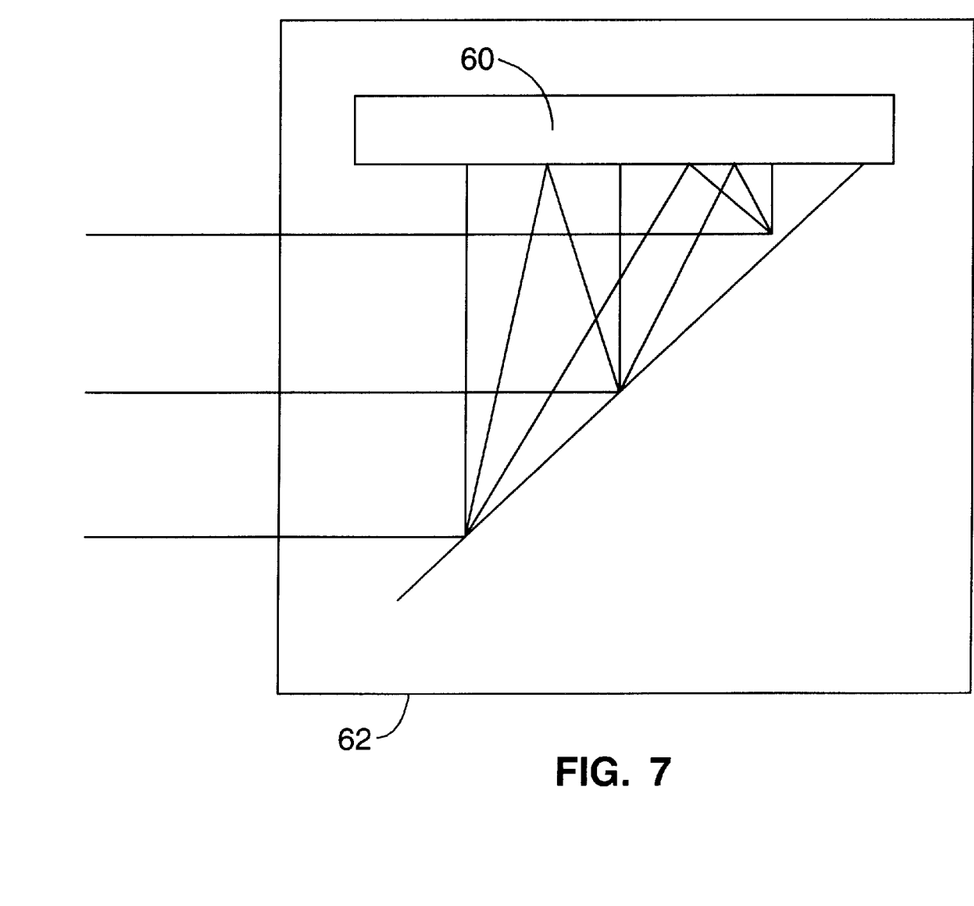
FIG. 7 is a schematic plan view of a single layer of the switching matrix portion of the optical switch shown in FIG. 6.

Referring now to FIG. 6 and FIG. 7, the fiber-optic switch, being symmetric about its center, can be implemented with a symmetry mirror 58 in the symmetry plane 60. This essentially cuts the component count in half. The output channels may either be on the input fibers and separable by optical rotators (not shown) or on a separate output fiber array (not shown) that is placed above the input array. In the latter case, the micromirror array 62 and the symmetry mirror 58 are slightly tilted about an axis, such that the light is directed to the output fiber array.

It will be appreciated that the fiber-optic switch of the present invention can serve network functions other than a traditional N×N×M (where M is the number of wavelengths in a WDM system).

It will further be appreciated that the fiber-optic switch of the present invention can be used in connection with diagnostic tools for WDM networks. WDM network management systems and software require knowledge of the state of the entire network. Knowledge of the state of the many distributed optical channels is especially important. The manager requires confirmation of whether or not a channel is active, its power and how much a channel optical frequency has drifted as well as the noise power level. Furthermore, this knowledge permits management software to identify, isolate, and potentially rectify or route around physical layer faults.

Clearly network management requires numerous channel spectrometers that may be deployed in large number at affordable prices. Traditionally, such spectrometers are fabricated from gratings and lenses while an electronically scanned diode array or a mechanically scanned grating provide spectral information. Unfortunately, diode array technology at 1.55 microns, and 1.3 microns, the preferred communications wavelengths, is immature. Such arrays are much more costly and unreliable than those available for the visible spectral region. Moving gratings are bulky and commercial system based on this approach are too costly for wide spread use in production networks.

Figure 8:
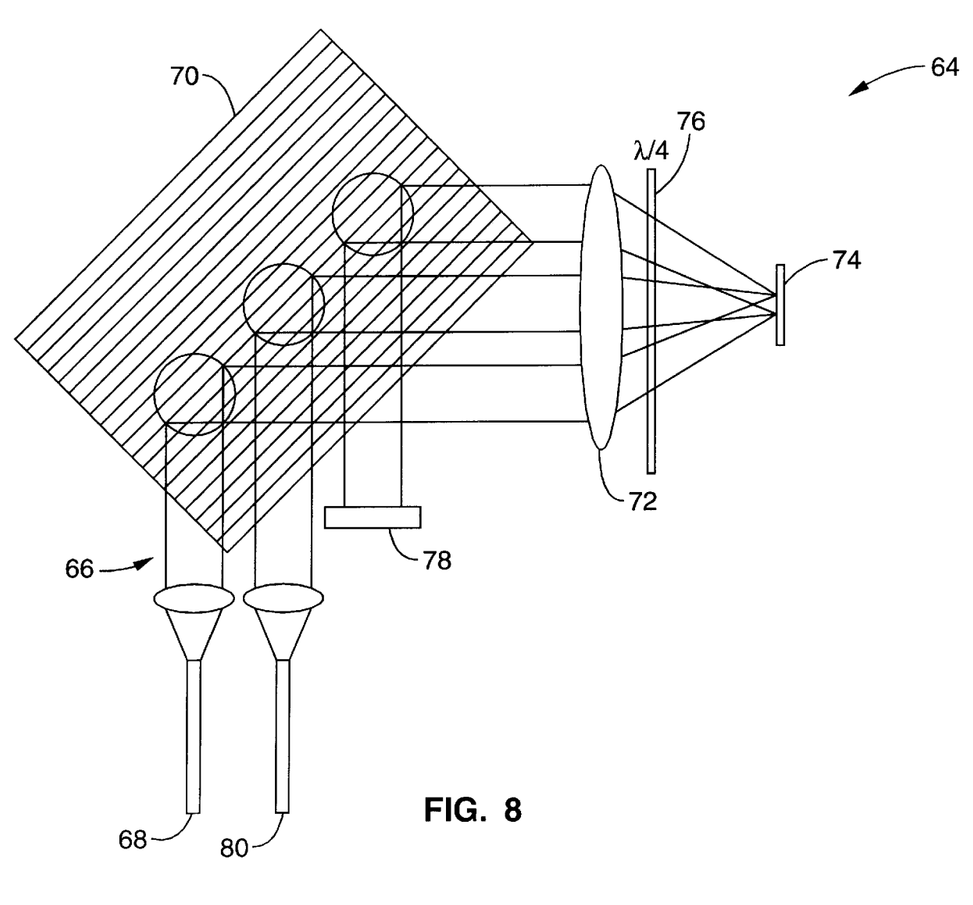
FIG. 8 is a schematic diagram of a WDM spectrometer employing an optical switch in accordance with the present invention.

Accordingly, a variation of the network switch described above can be employed to provide the desired functionality. Referring to FIG. 8, an in-line WDM spectrometer 64 in accordance with the present invention is shown. In the embodiment shown in FIG. 8, WDM optical signals 66 emanating from an input fiber 68 would be collimated and diffracted from the grating 70 forming a high resolution spatially dispersed spectrum at the lens 72 focal plane. A single MEMS switch array 74 would be placed at the lens focal plane, thus permitting the deflection of individual optical channels or portions of a channel by one or more mirrors in the array. A quarter-wave plate 76 is inserted symmetrically around the switching array 74 to compensate for the polarization sensitivity of the gratings 70. A single infrared diode detector 78 and focusing lens (not shown) would be placed in the return path of the reflected, and suitably displaced, return beam after a second grating diffraction from grating 70. A full spectrum can then be obtained by scanning a deflection across the mirror array. Hence, a synchronized readout of the single photo diode yields the full spectrum to the management software.

The input fiber 68 and output fiber 80 can be arranged in, a variety of ways. For example, they can be arranged side by side in the plane as shown in FIG. 8. An alternative would be to place the output fiber over or under the input fiber. A further alternative would be to use the same fiber for the input and output paths, and separate the signals using an optical circulator or the like.

The micromirror array 74 is preferably a one-dimensional array with one mirror per wavelength. Each mirror would thus operate in one of two states; the mirror either sends its corresponding wavelength to the output fiber 78 or is tilted (actuated) so that its corresponding wavelength is sent to the detector 76. In normal operation, only one of the mirrors is set up to deflect its wavelength to the detector.

Note also that, if the output fiber if removed and replaced by a beam sink (not shown), the spectrometer will still function although such an embodiment could not be used in an in-line application.

The invention has been described above by way of only a limited number of examples, but the invention is not intended to be limited by these examples. Many modifications and variations, as well as design changes to significantly reduce the overall size, are possible within the scope of this invention. For example, the beam radius in the switching matrix may be reduced. The no-obstruction criterion allows a change to $\omega_0=5$ micron for a 4-fiber switch, and this allows the focal length of both lenses to be reduced by a factor of 5. As another example, the micromachining technology may be improved to place the mirrors closer. The posts (as shown in FIG. 3) and addressing lines may be moved under the mirrors to reduce the beam radium on the grating by a factor of 1.2. Together with the increased diffraction angle of a micromachine grating (say, to 54.7 degrees from 45 degrees), the focal lengths of the lenses can be reduced by a factor of 1.7. As a third example, the fiber modes may be brought closer together on the in/out modules. If the mode spacing is reduced from 200 micron to 22.2 micron, the first and second lenses may have the same focal length (such that magnification=1). In addition, advanced designs may reduce the number of required components. The switch may be designed so as to be foldable about its symmetry point such that the same lenses and the same grating will be used both on the input and output sides. In summary, it is to be understood that all such modifications and variations that may be apparent to an ordinary person skilled in the art are intended to be within the scope of this invention.

Although the description above contains many specificities, these should not be construed as limiting the scope of the invention but as merely providing illustrations of some of the presently preferred embodiments of this invention. Thus the scope of this invention should be determined by the appended claims and their legal equivalents.

TABLE 1

| Components | Parameter Values |
|---|---|
| Input/output fibers | Fiber channels: 3 |
| | Standard single mode fiber |
| Input-output | MONET standard: |
| wavelengths | Center wavelength: 1.55 micron |
| | Wavelength channels: 8 |
| | Wavelength separation: 1.6 nm |
| Lenslets | Ball lens, 200-micron-diameter |
| | n < 1.6 |
| First lens | Bulk lens |
| | $f_1 = 125.5$ mm |
| Grating | Period: 0.95 micron |
| | Diffraction angle: 45 degrees |
| | Size: >6 mm |
| Second Lens | Bulk lens |
| | $f_2 = 78.5$ mm |
| Switching matrix | N = 3 |
| | Mirror spacing: |
| | Fiber dimension: 110 micron |
| | Wavelength dimension: 130 micron |
| | Array spacing: 2.5 mm |
| | Thickness of sacrificial layer: 2.75 micron |

What is claimed is:

1. A fiber optic switch, comprising:
   (a) an array of actuated mirrors for switching optic signals from a plurality of input optic fibers onto a plurality of output optic fibers;
   (b) a wavelength dispersive element;
   (c) a plurality of lenses associated with said wavelength dispersive element;
   (d) wherein said wavelength dispersive element and said plurality of lenses position optical beams from said input optic fibers onto said array of mirrors; and
   (e) a plurality of optical elements for positioning optical beams reflected from said array of mirrors onto said output fibers.

2. A fiber optic switch as recited in claim 1, wherein separate wavelength channels on each input optic fiber are switched independently by said array of mirrors.

3. A fiber optic switch as recited in claim 1, wherein said wavelength dispersive element comprises a diffraction grating.

4. A fiber optic switch as recited in claim 1, further comprising:
   (f) a second wavelength dispersive element;
   (g) said plurality optical elements associated with said second wavelength dispersive element;
   (h) wherein said second wavelength dispersive element and said plurality of optical elements position optical beams reflected by said array of mirrors onto said output optic fibers.

5. A fiber optic switch as recited in claim 4, wherein at least one of said wavelength dispersive elements comprises a diffraction grating.

6. A fiber optic switch, comprising:
   (a) an array of actuated mirrors for switching optic signals from a plurality of input optic fibers onto a plurality of output optic fibers;
   (b) a wavelength dispersive element; and
   (c) a plurality of lenses associated with said wavelength dispersive element;
   (d) wherein said wavelength dispersive element and said plurality of lenses position optical beams from said input optic fibers onto said array of mirrors.

7. A fiber optic switch as recited in claim 6, wherein separate wavelength channels on each input optic fiber are switched independently by said array of mirrors.

8. A fiber optic switch as recited in claim 6, wherein said wavelength dispersive element comprises a diffraction grating.

9. A fiber optic switch as recited in claim 6, further comprising:
(e) a second wavelength dispersive element; and
(f) a second plurality of lenses associated with said second wavelength dispersive element;
(g) wherein said second wavelength dispersive element and said second plurality of lenses position optical beams reflected by said array of mirrors onto said output optic fibers.

10. A fiber optic switch as recited in claim 9, wherein at least one of said wavelength dispersive elements comprises a diffraction grating.

11. A fiber optic switch, comprising:
(a) an array of actuated mirrors for switching optic signals from a plurality of input optic fibers onto a plurality of output optic fibers;
(b) a first wavelength dispersive element;
(c) a first plurality of lenses associated with said first wavelength dispersive element;
(d) a second wavelength dispersive element; and
(e) a second plurality of lenses associated with said second wavelength dispersive element;
(f) wherein said first wavelength dispersive element and said first plurality of lenses position optical beams from said input optic fibers onto said array of mirrors and wherein said second wavelength dispersive element and said second plurality of lenses position optical beams reflected by said array of mirrors onto said output optic fibers.

12. A fiber optic switch as recited in claim 11, wherein separate wavelength channels on each input optic fiber are switched independently by said array of mirrors.

13. A fiber optic switch as recited in claim 11, wherein at least one of said wavelength dispersive elements comprises a diffraction grating.

14. A fiber optic switch, comprising:
(a) a plurality of input optic fibers;
(b) a plurality of output optic fibers:
(c) an array of actuated mirrors for switching optic signals from said input optic fibers onto said output optic fibers;
(d) a first wavelength dispersive element;
(e) a first plurality of lenses associated with said first wavelength dispersive element;
(f) a second wavelength dispersive element; and
(g) a second plurality of lenses associated with said second wavelength dispersive element;
(h) wherein said first wavelength dispersive element and said first plurality of lenses position optical beams from said input optic fibers onto said array of mirrors and wherein said second wavelength dispersive element and said second plurality of lenses position optical beams reflected by said array of mirrors onto said output optic fibers.

15. A fiber optic switch as recited in claim 14, wherein separate wavelength channels on each input optic fiber are switched independently by said array of mirrors.

16. A fiber optic switch as recited in claim 14, wherein at least one of said wavelength dispersive elements comprises a diffraction grating.

17. A fiber optic spectrometer, comprising:
(a) a fiber opt ic input path;
(b) a fiber optic output path;
(c) a detector;
(d) an array of actuated mirrors for switching optic signals from said fiber optic input path to said fiber optic output path or said detector;
(e) a wavelength dispersive element; and
(f) a lens associated with said wavelength dispersive element;
(g) wherein said wavelength dispersive element and said lens positions optical beams from said fiber optic input path onto said array of mirrors.

18. A fiber optic spectrometer as recited in claim 17, wherein said fiber optic input path and said fiber optic output path share a single optic fiber.

19. A fiber optic spectrometer as recited in claim 17, wherein said fiber optic input path and said fiber optic output path are carried by separate optic fibers.

20. A fiber optic spectrometer, comprising:
(a) an input optic fiber;
(b) an output optic fiber;
(c) a detector;
(d) an array of actuated mirrors for switching optic signals from said input optic fiber onto said output optic fiber or said detector;
(e) a wavelength dispersive element; and
(f) a lens associated with said wavelength dispersive element;
(g) wherein said wavelength dispersive element and said lens positions optical beams from said input optic fiber onto said array of mirrors.

* * * * *

(12) REEXAMINATION CERTIFICATE (4787th)
United States Patent
Solgaard et al.

(10) Number: US 6,097,859 C1
(45) Certificate Issued: May 27, 2003

(54) MULTI-WAVELENGTH CROSS-CONNECT OPTICAL SWITCH

(75) Inventors: Olav Solgaard, Davis, CA (US); Jonathan P. Hertiage, Davis, CA (US); Amal R. Bhattarai, Davis, CA (US)

(73) Assignee: The Reagents of the University of California, Oakland, CA (US)

Reexamination Request:
No. 90/006,278, May 6, 2002

Reexamination Certificate for:
Patent No.: 6,097,859
Issued: Aug. 1, 2000
Appl. No.: 09/022,591
Filed: Feb. 12, 1998

Related U.S. Application Data
(60) Provisional application No. 60/038,172, filed on Feb. 13, 1997.

(51) Int. Cl.⁷ ............................................. G02B 6/35
(52) U.S. Cl. ......................................... 385/17; 385/18
(58) Field of Search .................. 385/16, 17, 18, 385/19, 20, 21, 22, 23, 24

(56) References Cited

U.S. PATENT DOCUMENTS

| | | | |
|---|---|---|---|
| 4,678,332 A | 7/1987 | Rock et al. | 356/328 |
| 4,983,039 A | 1/1991 | Harada et al. | 356/328 |
| 5,226,099 A | 7/1993 | Mignardi et al. | 385/19 |
| 5,233,405 A | 8/1993 | Wildnauer et al. | 356/333 |
| 5,255,332 A | 10/1993 | Welch et al. | 385/17 |
| 5,414,540 A | 5/1995 | Patel et al. | 359/38 |
| 5,504,575 A | 4/1996 | Stafford | 356/330 |
| 5,610,757 A | 3/1997 | Ji et al. | 359/298 |
| 5,627,925 A | 5/1997 | Alferness et al. | 385/17 |
| 5,633,755 A | 5/1997 | Manabe et al. | 359/443 |
| 5,768,006 A | 6/1998 | Min et al. | 359/290 |
| 5,796,479 A | 8/1998 | Derickson et al. | 356/326 |
| 5,920,417 A | 7/1999 | Johnson | 359/223 |
| 6,028,689 A | 2/2000 | Michalicek et al. | 359/224 |
| 6,072,923 A | 6/2000 | Stone | 385/16 |
| 6,204,919 B1 | 3/2001 | Barshad et al. | 356/326 |
| 6,212,309 B1 | 4/2001 | Nguyen et al. | 385/17 |
| 6,263,123 B1 | 7/2001 | Bishop et al. | 385/15 |
| 6,289,145 B1 | 9/2001 | Solgaard et al. | 385/17 |
| 6,327,398 B1 | 12/2001 | Solgaard et al. | 385/18 |
| 6,374,008 B2 | 4/2002 | Solgaard et al. | 385/17 |
| 6,389,190 B2 | 5/2002 | Solgaard et al. | 385/18 |

FOREIGN PATENT DOCUMENTS

| | | | |
|---|---|---|---|
| EP | 0548830 | 6/1993 | 356/330 X |
| JP | 2617054 | 6/1997 | 385/15 X |

OTHER PUBLICATIONS

Toshiyoshi, H. et al.; "Optical Crossconnection by Silicon Micromachined Torsion Mirrors," Advanced Application of Lasers in Materials Processing/Broadband Optical Networks/Smart Pixels/Optical MEMs and Their Applications, IEEE/LEOS 1996 Summer Topical Meetings, pp. 63–64, Aug. 5–9, 1996.

Timofeev, F.N. et al.; "1.5μm Free–Space Grating Multi Demultiplexer and Rounting Switch," Electronics Letters, vol. 32, No. 14, pp. 1307–1308, Jul. 4, 1996.

4×4 Fiber Optic Crossbar Switch Using the Deformable Mirror Device, Gus T. MacDonald, et al. Texas Inst. Inc., Central Research Laboratory, Dallas, Tx 1990, Report No. ISBN1557521425 IRN14856463, Optical Society of America, 1990, vol. 14.

Primary Examiner—Brian Healy (57) ABSTRACT

A cross-connect switch for fiber-optic communication networks employing a wavelength dispersive element, such as a grating, and a stack of regular (non-wavelength selective) cross bar switches using two-dimensional arrays of micromachined, electrically actuated, individually-tiltable, controlled deflection micro-mirrors for providing multiport switching capability for a plurality of wavelengths. Using a one-dimensional micromirror array, a fiber-optic based MEMS switched spectrometer that does not require mechanical motion of bulk components or large diode arrays can be constructed with readout capability for WDM network diagnosis or for general purpose spectroscopic applications.

REEXAMINATION CERTIFICATE ISSUED UNDER 35 U.S.C. 307

NO ADMENDMENTS HAVE BEEN MADE TO THE PATENT

AS A RESULT OF REEXAMINATION, IT HAS BEEN DETERMINED THAT:

The patentability of claims 1–19 and 20 is confirmed.

\* \* \* \* \*